US007936914B2

(12) United States Patent
Shimizu et al.

(10) Patent No.: US 7,936,914 B2

(45) Date of Patent: May 3, 2011

(54) AUTHENTICITY DETERMINATION METHOD, APPARATUS, AND PROGRAM

(75) Inventors: Tadashi Shimizu, Ashigarakami-gun (JP); Tetsuya Kimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1135 days.

(21) Appl. No.: 11/658,322

(22) PCT Filed: Aug. 10, 2005

(86) PCT No.: PCT/JP2005/014688

§ 371 (c)(1), (2), (4) Date: Jan. 24, 2007

(87) PCT Pub. No.: WO2006/016622

PCT Pub. Date: Feb. 16, 2006

(65) Prior Publication Data

US 2008/0060079 A1 Mar. 6, 2008

(30) Foreign Application Priority Data

Aug. 11, 2004 (JP) ................................ 2004-234502

(51) Int. Cl.

| | |
|---|---|
| ***G06K 9/00*** | (2006.01) |
| ***G06K 9/62*** | (2006.01) |
| ***G06K 9/74*** | (2006.01) |
| ***G06K 11/00*** | (2006.01) |
| ***G02B 5/32*** | (2006.01) |
| ***G01N 21/86*** | (2006.01) |
| ***C07F 7/04*** | (2006.01) |

(52) U.S. Cl. .......... 382/135; 382/137; 382/209; 359/15; 356/71; 250/559.11; 250/556; 194/207

(58) Field of Classification Search .................. 382/181, 382/135, 137, 209; 359/15; 256/71; 250/559.11, 250/556; 194/207

See application file for complete search history.

(56) References Cited

U.S. PATENT DOCUMENTS 3,679,314 A * 7/1972 Mustert .......................... 356/71

(Continued)

FOREIGN PATENT DOCUMENTS

JP A 4-106692 4/1992

(Continued)

OTHER PUBLICATIONS

European Patent Office, *European Search Report for Application No. 05 77 0475*, dated Nov. 15, 2010, pp. 1-6.

*Primary Examiner* — Kathleen S Yuan

(74) *Attorney, Agent, or Firm* — Oliff & Berridge, PLC

(57) ABSTRACT

To determine authenticity of a solid body simply and precisely, a reference area of a paper sheet which is genuine is optically read from two different directions, and the image is registered as a reference image. A check area of a paper sheet subjected to the authenticity determination, including the reference area and having a size larger than the reference area, is read from two different directions with a scanner, and data on a partial area having the same size as the reference area are extracted from each set of check data collected by the reading. For a set consisting of the reference image and the check image optically read from the same direction, the value of the correlation with the reference image is repetitively calculated by the normalized correlation method while the partial area is shifted within the check area. The maximum correlation value and the normalized score of the maximum correlation value are compared with respective thresholds to determine the authenticity of the paper sheet. If the paper sheet is determined to be "genuine" for the authenticity determination of each set, the paper sheet subjected to the authenticity determination is finally determined to be "genuine."

3 Claims, 9 Drawing Sheets

U.S. PATENT DOCUMENTS

| | | | | | |
|---|---|---|---|---|---|
| 4,737,649 | A * | 4/1988 | Naruse | 250/559.11 |
| 4,980,569 | A * | 12/1990 | Crane et al. | 250/556 |
| 5,992,601 | A * | 11/1999 | Mennie et al. | 194/207 |
| 6,529,269 | B1 * | 3/2003 | Sugata | 356/71 |
| 6,731,785 | B1 * | 5/2004 | Mennie et al. | 382/135 |
| 6,848,561 | B2 * | 2/2005 | Bao | 194/207 |
| 6,980,684 | B1 * | 12/2005 | Munro et al. | 382/135 |
| 7,184,133 | B2 * | 2/2007 | Coombs et al. | 356/71 |
| 7,242,796 | B2 * | 7/2007 | Matsui et al. | 382/135 |
| 7,266,231 | B2 * | 9/2007 | Christophersen et al. | 382/137 |
| 7,711,175 | B2 * | 5/2010 | Endo et al. | 382/137 |
| 2003/0081824 | A1 * | 5/2003 | Mennie et al. | 382/135 |
| 2003/0219145 | A1 | 11/2003 | Smith | |
| 2004/0073526 | A1 * | 4/2004 | McClanahan | 706/15 |
| 2004/0178044 | A1 * | 9/2004 | Mori et al. | 194/206 |
| 2004/0218802 | A1 * | 11/2004 | Suzuki | 382/137 |
| 2004/0247169 | A1 * | 12/2004 | Ross et al. | 382/137 |
| 2005/0041273 | A1 * | 2/2005 | Zhang | 359/15 |
| 2006/0159329 | A1 * | 7/2006 | Joshi et al. | 382/135 |
| 2007/0216518 | A1 * | 9/2007 | Hoffmuller | 340/5.85 |

FOREIGN PATENT DOCUMENTS

| | | |
|---|---|---|
| JP | B2 6-16312 | 3/1994 |
| JP | A 2000-94865 | 4/2000 |
| JP | A 2000-146952 | 5/2000 |
| JP | A 2002-518608 | 6/2002 |
| JP | A 2003-141595 | 5/2003 |
| JP | A 2004-151833 | 5/2004 |
| WO | WO 82/00062 | 1/1982 |
| WO | WO 99/66128 | 12/1999 |
| WO | WO 03/049022 A1 | 6/2003 |

* cited by examiner

AUTHENTICITY DETERMINATION METHOD, APPARATUS, AND PROGRAM

TECHNICAL FIELD

The present invention generally relates to an authenticity determination method, an authenticity determination apparatus, and a program, and more particular to an authenticity determination method for determining authenticity of a solid body with a readable and unique characteristic having randomness distributed along a surface thereof, to an authenticity determination apparatus to which the above described authenticity determination method is applied, and to a program causing a computer to function as the above-described authenticity determination apparatus.

BACKGROUND ART

In recent years, with copy machines or printers having improved in performance, copies of banknotes, securities, and the like copied with such copy machines or printers have frequently been misused. Against such a background, in order to inhibit forgery or such misuse of the copies, establishment of a technique of precisely determining authenticity of various types of paper documents (including, for example, passports, title certificates of various types, residence certificates, birth certificates, insurance certificates, guarantee certificates, confidential documents, and the like, in addition to the above described banknotes or securities) has long been awaited.

DISCLOSURE OF THE INVENTION

According to an aspect of the invention, there is provided an authenticity determination method performed by a computer for determining authenticity of a solid body with a readable and unique characteristic having randomness distributed along a surface thereof, including generating, as a reference image, a read image of a state of a surface of a genuine solid body, the read image being read by a light-receiving unit receiving reflected light of light illuminated by a light-emitting unit toward the surface of the genuine solid body from at least one of a first direction, and a second direction which is different from the first direction, and also generating, as a check image, a read image of a state of a surface of a solid body to be determined, the read image being read by a light-receiving unit receiving reflected light of light illuminated by a light-emitting unit toward the surface of the solid body to be determined from at least one of the first direction and the second direction, and performing a check process with at least two sets of read reference images and read check images, including one or two read reference images included in the reference image and one or two read check images included in the check image.

In this aspect of the invention, the check process is performed between first and/or second read reference images based on illuminations from the first and/or the second directions included in the reference image, and first and/or second read check images based on the illuminations from the first and/or the second directions included in the check image. Specifically, the check process is performed with a combination of the first or the second read reference image and the first and the second read reference images, or the first and the second read reference images and the first or the second read reference image, or further the first read reference image and the first read reference image as well as the second read reference image and the second read reference image. In this way, this aspect of the invention uses at least two sets of the read reference images and the read check images in the check process, so that the authenticity of the solid body can be determined more precisely.

According to another aspect of the invention, the generating step generates, as the reference image, a first read reference image and a second read reference image based on illuminations from both the first and the second directions, and also generates as the check image a first read check image and a second read check image based on the illuminations from both of the first and the second directions; the performing step checks between the first read reference image and the first read check image, as well as between the second read reference image and the second read check image, and, as a result of the respective check processes, the determining step determines the solid body to be genuine if a preset determination criterion has been satisfied in both processes.

According to another aspect of the invention, if the check processes have been performed with the reference image and the check image based on the illuminations from the same direction, the determining step determines the solid body to be genuine when a normalized correlation value of the reference image and the check image is greater than or equal to a preset threshold.

In this aspect of the invention, the check processes are performed between the read images based on the illuminations from the first direction, as well as between the read images based on the illuminations from the second direction, thereby enabling the authenticity determination with simple comparison processes.

According to another aspect of the invention, if the check processes have been performed with the reference image and the check image based on the illuminations from different directions, the determining step determines the solid body to be genuine, when a normalized correlation value of the reference image and the check image is less than or equal to a preset threshold.

In this way, the authenticity of the solid body can be determined also with the reference image and the check image based on the illuminations from the different directions.

According to another aspect of the invention, the first direction and the second direction are opposite directions with respect to a reading position on the surface of the solid body. In this aspect of the invention, an image of a predetermined area is read from so-called opposite directions, and thereby light and dark patterns appear in opposite values. Therefore, values of the normalized correlation value and the like may be easily used in the authenticity determination process.

According to another aspect of the invention, there is provided an authenticity determination apparatus that determines authenticity of a solid body with a readable and unique characteristic having randomness distributed along a surface thereof, including a first light-emitting unit that illuminates light toward a surface of a genuine solid body from at least one of a first direction, and a second direction which is different from the first direction; a first light-receiving unit that receives reflected light of the light illuminated by the first light-emitting unit; a reference image generation unit that generates a read image of a state of the surface of the genuine solid body as a reference image, from an output of the first light-receiving unit; a second light-emitting unit that illuminates light toward a surface of a solid body to be determined from at least one of the first direction and the second direction; a second light-receiving unit that receives reflected light of the light illuminated by the second light-emitting unit; a check image generation unit that generates, as a check image, a read image of a state of the surface of the solid body to be determined, from an output of the second light-receiving unit; and a determination unit that determines authenticity of the solid body to be determined by performing a check process based on the reference image and the check image generated by the respective image generation units.

According to another aspect of the invention, there is provided a program causing a computer connected with a reading apparatus capable of reading a characteristic unique to a solid body, the characteristic being distributed along a surface of the solid body and having randomness, to execute a process, the process including generating, as a reference image, a read image of a state of a surface of a genuine solid body, the read image being read by a light-receiving unit receiving reflected light of light illuminated by a light-emitting unit toward the surface of the genuine solid body from at least one of a first direction, and a second direction which is different from the first direction; generating, as a check image, a read image of a state of a surface of a solid body to be determined, the read image being read by a light-receiving unit receiving reflected light of light illuminated by a light-emitting unit toward the surface of the solid body to be determined from at least one of the first direction and the second direction; and performing a check process between one or two read reference images included in the reference image and one or two read check images included in the check image.

According to an aspect of the invention, when determining the authenticity of the solid body to be determined with the check between the reference image and the check image, the check process is performed with a combination of at least two sets of the read reference images and the read check images, including one or two read reference images included in the reference image and one or two read check images included in the check image. In other words, the read reference images are obtained from different directions with respect to a single reference area, or the read check images are obtained from different directions with respect to a single check area, and the check process is performed with a combination of 1 to 2, 2 to 1, or 2 to 2 images, thereby enabling more precise determination of the authenticity of the solid body to be determined.

BRIEF DESCRIPTION OF THE DRAWINGS

Embodiments of the present invention will be described in detail by reference to the following figures, wherein.

BEST MODE FOR CARRYING OUT THE INVENTION

Hereinafter, an exemplary embodiment of the present invention will be described by reference to the drawings.

Figure 1:
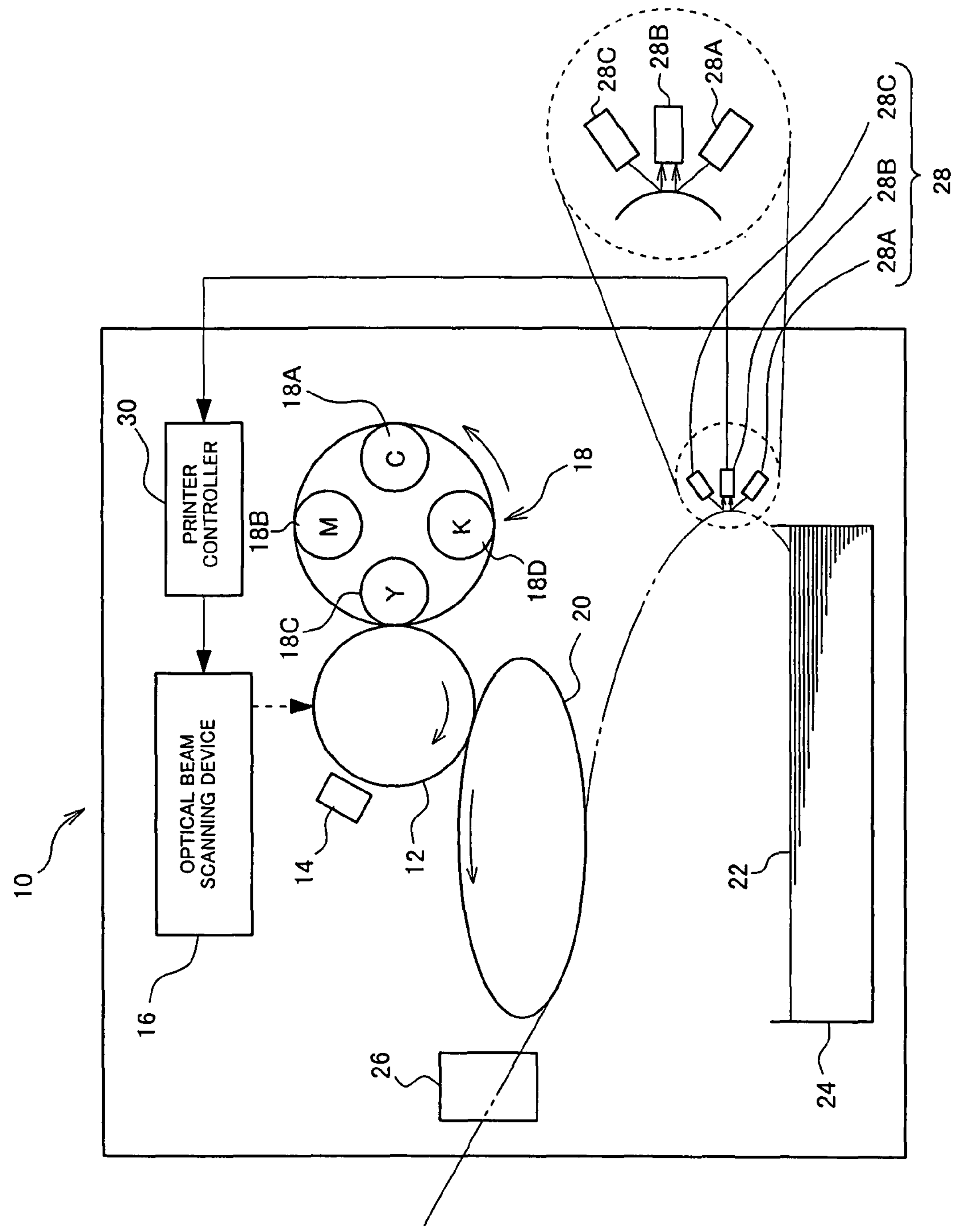
FIG. 1 is a general configuration diagram of a color printer according to the present embodiment.

FIG. 1 shows a color printer 10 according to this exemplary embodiment. The color printer 10 includes a photoreceptor drum 12 as an image supporter. This photoreceptor drum 12 is charged by an electrification device 14. On the upper side of the photoreceptor drum 12, an optical beam scanning device 16 that emits an optical beam is arranged. The optical beam is modulated depending on an image to be formed and is deflected along a main scan direction (a direction parallel to an axis line of the photoreceptor drum 12). The optical beam emitted by the optical beam scanning device 16 scans a surface of the photoreceptor drum 12 in the main scan direction while the photoreceptor drum 12 is rotated and sub scanning is performed, thereby forming an electrostatic latent image on the surface of the photoreceptor drum 12.

Also, on the right side of the photoreceptor drum 12 in FIG. 1, a multicolor developing device 18 is arranged. The multicolor developing device 18 includes developing devices 18A to 18D each loaded with a toner of one of the colors C (cyan), M (magenta), Y (yellow) and K (black), and develops the electrostatic latent image formed on the photoreceptor drum 12 in the respective color C, M, Y or K. It should be noted that a full color image is formed in the color printer 10 by repetitively forming the electrostatic latent image on the same area on the photoreceptor drum 12 and developing the image in the different colors several times, and sequentially superimposing respective toner images on the area.

An endless transfer belt 20 is arranged adjacent to the photoreceptor drum 12, and a paper tray 24 for accommodating recording paper sheets 22 is arranged on the lower side of a position where the transfer belt 20 is arranged. A surface of the transfer belt 20 contacts the surface of the photoreceptor drum 12 at a downstream position with respect to a developing position of the multicolor developing device 18, in a rotation direction of the photoreceptor drum 12. The toner image formed on the photoreceptor drum 12 is once transferred on the transfer belt 20 and then transferred again on the recording paper sheet 22, which has been pulled out of the paper tray 24 and conveyed to the position where the transfer belt 20 is arranged. A fixing device 26 is arranged in a path for conveying the recording paper sheet 22 out of the color printer 10. The fixing device 26 fixes the toner image on the recording paper sheet 22 already having the toner image transferred thereon, and then the recording paper 22 is ejected out of the color printer 10.

Also, a reading unit 28 is arranged in a path (shown in FIG. 1 with an imaginary line) for conveying the recording paper sheet 22 from the paper tray 24 to the position where the transfer belt 20 is arranged. The reading unit 28 includes light-emitting devices 28A and 28C that illuminate light onto the recording paper sheet 22, and a light-receiving device 28B that receives the light having been emitted by the light-emitting devices 28A and 28C and reflected on the recording paper sheet 22. In this exemplary embodiment, the respective light-emitting devices 28A and 28C are arranged so that they sandwich the light-receiving device 28B; that is, they illuminate the light onto the recording paper sheet 22 from different directions opposite each other with respect to a reading position on the recording paper sheet 22. In other words, the light-receiving device 28B is used as a light-receiving unit for both of the light-emitting devices 28A and 28C. Moreover, the reading unit 28 includes a signal-processing circuit (not shown) that converts a signal output from the light-receiving device 28B into digital data and outputs the data, thereby enabling reading of random variation of an optical reflectance distributed along a surface of the recording paper sheet 22 due to randomness in intertwining of fiber materials forming the recording paper sheet 22, at a predetermined resolution (for example, 400 dpi) and a predetermined tone (for example, 8-bit gray scale).

A printer controller 30 is connected to the optical beam scanning device 16. An operation unit (not shown) configured to include a keyboard and a display, and the reading unit 28 are connected to this printer controller 30, and a personal computer (not shown) for inputting data to be printed on the recording paper sheet 22 is further connected to the printer controller 30, either directly or via a network such as LAN or the like. The printer controller 30 is configured to include a microcomputer and controls operations of respective parts in the color printer 10 including the optical beam scanning device 16.

Figure 2:
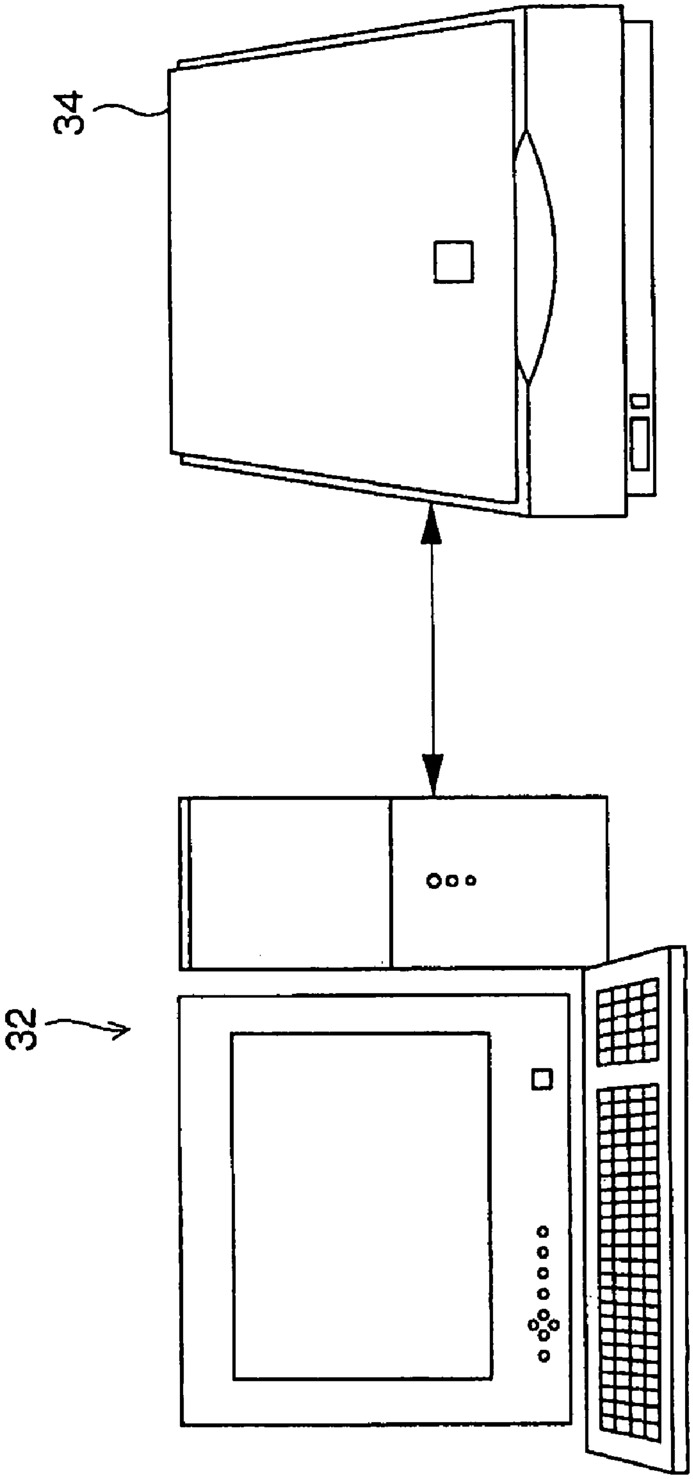
FIG. 2 is an external view of a PC and a scanner functioning as an authenticity determination apparatus according to the present embodiment.

FIG. 2 shows a personal computer (PC) 32 and a scanner 34 capable of functioning as an authenticity determination apparatus according to the present invention. Although not shown, the PC 32 includes a CPU, ROM, RAM, and an input-output port, which are connected to one another via a bus. In addition, a display, a keyboard, a mouse, and a hard disk drive (HDD) are connected to the input-output port. The HDD stores programs for an OS and various kinds of application software, and also stores an authenticity determination program for performing an authenticity determination process described below.

Meanwhile, the scanner 34 is of a flatbed type, and includes a function of reading a manuscript placed on a manuscript stand (not shown) at the same resolution (for example, 400 dpi) and the same tone (for example, 8-bit gray scale) as those for the above-described reading unit 28. The scanner 34 is connected to the input-output port of the PC 32. The PC 32 controls the scanner 34 to read the manuscript, and image data obtained by reading the manuscript with the scanner 34 are input to the PC 32.

Figure 3:
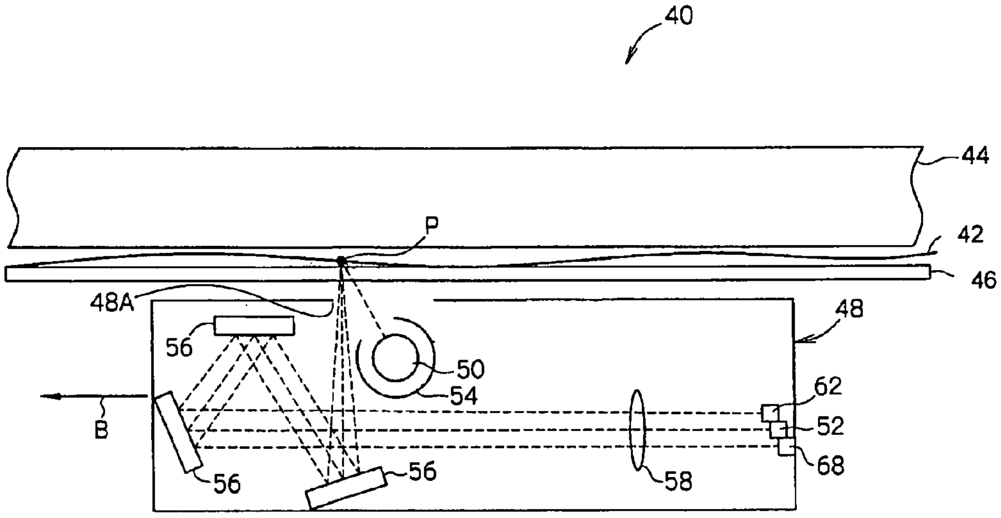
FIG. 3 shows an inner structure of the scanner in the present embodiment.

FIG. 3 shows a partial inner structure of the scanner 34. The scanner 34 uses a platen cover 44 to hold down a manuscript 42 placed on a plane glass cover 46 corresponding to the manuscript stand on the upper side of a body of the scanner 34, and reads the manuscript at a reading position P. A light source 50 corresponding to a light-emitting unit arranged in a reflection plate 54 emits the light toward the reading position P through an aperture 48A of a carriage 48. Reflected light from the reading position P goes through the aperture 48A, and is received at line image sensors 52, 62, and 68 via mirrors 56 and a lens 58. A drive controller (not shown) of the scanner 34 reads the image while moving the carriage 48 in a direction shown by an arrow B, and thereby reads the image of the entire manuscript 42. This read image is sent to the PC 32 as described above. It should be noted that a general purpose scanner 34 can be used in this exemplary embodiment.

Incidentally, the inventors have ascertained a cause of a conventional erroneous determination as follows. When a reference image is formed, if light is illuminated from a diagonal direction toward a solid body, shaded areas are formed due to slight irregularity of a fixed surface having randomness. That is, even if a surface in a predetermined area on the solid body has randomness, a random light and dark pattern (shading information) based on the irregularity of the solid body surface, which is formed by illuminating the light to the predetermined area from a certain direction, is consistently formed as the same pattern. Therefore, related art devices effectively use a characteristic in which the shading information included in the image read in the predetermined area (reference image) consistently forms the same pattern, and perform the authenticity determination. However, if this characteristic is inversely used to precisely reproduce the shading information on a false solid body, the false solid body may be erroneously determined to be a genuine one.

However, in respective sets of shading information obtained by illuminating the lights from different directions to the same predetermined area, different light and dark patterns are formed due to the irregularity of the fixed surface. The present inventors focused attention on this point.

Next, as operations of this exemplary embodiment, processes in the color printer 10 will be described first.

If a document to be printed on the recording paper sheet 22 is an original, the color printer 10 according to this exemplary embodiment has a function of printing the document as the original (and also printing, on the recording paper sheet 22, reference data to be used for determining authenticity of the document). If a user uses the color printer 10 to perform the printing, the user sends print data representing the document to be printed on the recording paper sheet 22 from the PC to the color printer 10. Then if the document to be printed is a document to be used as the original, the user also instructs the color printer 10 to print the document to be printed as the original.

If the user has issued an instruction as above, the printer controller of the color printer 10 performs a reference data registration process. Hereinafter, this reference data registration process will be described with reference to a flowchart shown in FIG. 4.

In step 100, the recording paper sheet 22 on which the document is printed as the original is taken out of the paper tray 24, and conveyed to a position where the reading unit 28 is arranged (reading position). When the recording paper sheet 22 arrives at the reading position, in subsequent step 102, the reading unit 28 reads a predetermined reference area (the area having a size of 32×32 dots (approximately 2 mm×approximately 2 mm)) on the recording paper sheet 22 at the predetermined resolution (400 dpi) and the predetermined tone (8-bit gray scale). More particularly, the reading unit 28 operates as follows.

When the predetermined reference area on the recording paper sheet 22 has arrived at a predetermined reading position, either one of the light-emitting devices; for example, the light-emitting device 28A, illuminates light, and the light-receiving device 28B receives its reflected light, whereby the predetermined reference area is read. At this time, the light-emitting device 28C emits no light. After reading at the light-receiving device 28B, the other light-emitting device 28C illuminates light, and the light-receiving device 28B receives its reflected light, whereby the predetermined reference area is read. At this time, the light-emitting device 28A emits no light. For example, if the light-emitting device 28A positioned in a direction which the recording paper sheet 22 leaves is referred to as a first direction, and the light-emitting device 28C positioned in a direction which the recording paper sheet 22 approaches is referred to as a second direction, the reading unit 28 in this exemplary embodiment would operate as described above to read the reference area from two different directions; that is, the first and the second directions. It should be noted that successive image-reading processes from two directions are possible in terms of processing speed.

Figure 5:
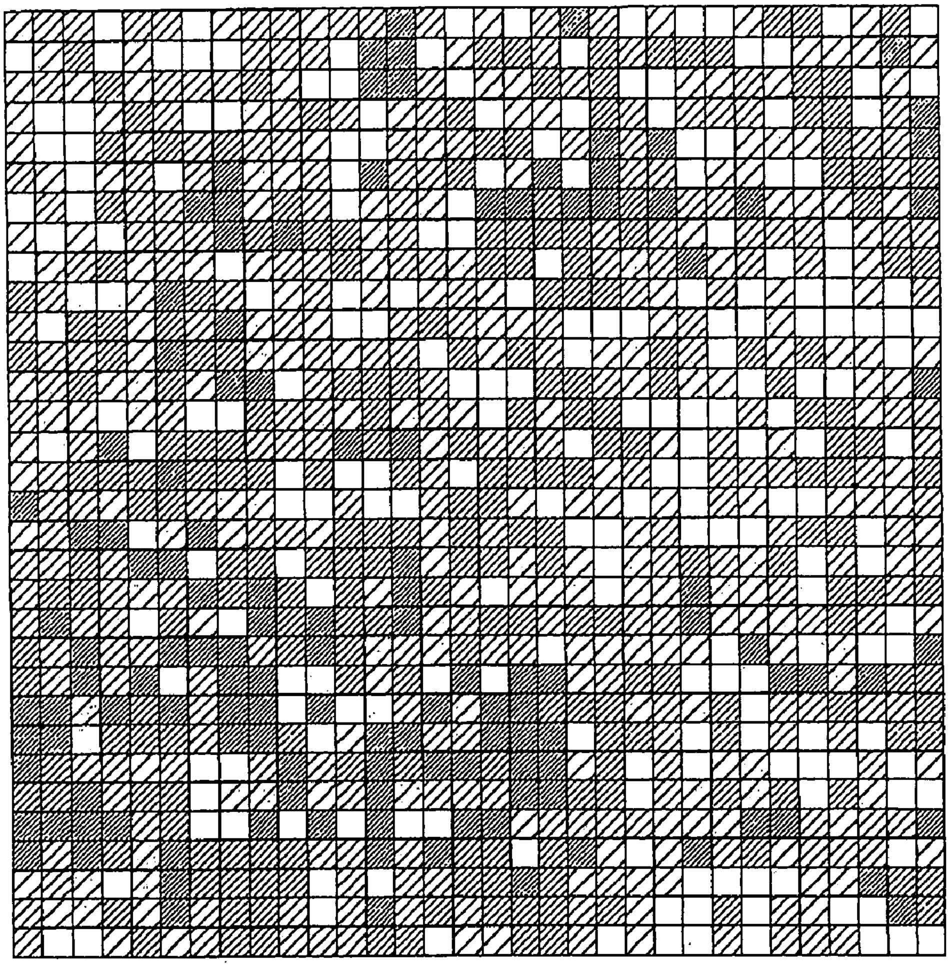
FIG. 5 is an image diagram in which an example of reference data to be used in the present embodiment has been visualized.

This causes the reading unit 28 to output a reference image representing random variation of clarity of a paper sheet in the reference area on the recording paper sheet 22 to be read, due to the randomness in intertwining of the fiber materials forming the recording paper sheet 22 to be read. This reference image includes an image read with the illumination from the first direction and an image read with the illumination from the second direction. It should be noted that the first and second directions are only required to be different directions, and either may be the first direction in relation to the present invention. Since this exemplary embodiment assumes a reading resolution as 400 dpi, a reading tone as 8-bit gray scale, and the reference area to be read as 32×32 dots, a size of each read image included in the reference image would be 1024 bytes and a tone value (brightness value) of each pixel (dot) would be an integer in the range of 0 to 255. FIG. 5 shows an example of an image in which an image represented by the reference image was visualized (with a corrected contrast for easy visibility) on the basis of the reference image obtained by the above-described reading. It should be noted that, in this exemplary embodiment, since the image of the reference area is read by illuminating the light from two opposite directions, plainly speaking, if one image is shown in FIG. 5, an image having light and dark inverted from those of the shown image can be obtained as the other image.

It should be noted that the reference area may be at an arbitrary position on the recording paper sheet 22, the position of the reference area may be fixed on the recording paper sheet 22, or the position of the reference area may be changed on the recording paper sheet 22 depending on the document (contents of the original). Also, the reference area may be input and designated by the user, or automatically set by the printer controller 30. However, after the reference area has been read, if the printing causes the toner (or ink) in the reference area to adhere on the recording paper sheet 22, a maximum value of correlation values calculated in the authenticity determination described below becomes significantly low, which is very likely to cause an erroneous determination. Therefore, in the case of fixing the position of the reference area, the reference area is preferably fixed at a position on the recording paper sheet 22 where the toner cannot adhere (for example, a position corresponding to an area falling outside a printable range for the color printer 10). In the case of the position of the reference area changing depending on the document, a range on the recording paper sheet 22 where the toner or the like may not adhere is determined on the basis of print data, and the reference area is preferably set in the determined range. Particularly, in the authenticity determination process described below, since an area larger than the reference area (for example, an area of 64×64 dots) is read as a check area, the reference area is preferably an area where the toner or the like may not adhere also in its surrounding area.

Also, the reference area can be read after the printing has been performed on the recording paper sheet 22. In this case, even if the reference area includes a portion on the recording paper sheet 22 with the toner or the like adhering, it is less likely to cause an erroneous determination in the authenticity determination, in comparison with the case where the toner or the like adheres in the reference area on the recording paper sheet 22 by the printing performed after reading the reference area as described above. However, it cannot be said that the variation in clarity of the portion on the paper sheet with the toner or the like adhering is random (the variation cannot be said to be unique to an individual paper sheet). If the reference data obtained by setting the reference area at the portion with non-random clarity variation and reading the reference area are used for the authenticity determination, the data are vulnerable to forgery. Therefore, the reference area is preferably set in a range on the paper sheet without the toner or the like adhering, also in the case of reading the reference area after the printing has been performed on the recording paper sheet 22.

In the case of reading the reference area after the printing has been performed on the recording paper sheet 22, the range on the recording paper sheet 22 without the toner adhering can be determined by using the print data as described above. However, with respect to the portion on the recording paper sheet 22 with the toner or the like adhering, which apparently has a larger contrast in comparison to a portion without the toner or the like adhering, the recording paper sheet 22 is read, and, on the basis of data obtained by the reading, the contrast (a difference between a maximum value and a minimum value of the tone value (brightness value or density value)) is obtained for each portion on the recording paper sheet 22, instead of using the print data as described above. The range on the recording paper sheet 22 without the toner or the like adhering can also be determined in this way.

Moreover, generally, the larger the size of the area to be read (specifically, an area for which the correlation values are calculated in the authenticity determination), the greater a determination precision in the authenticity determination (at least one of FAR (False Acceptance Rate) and FRR (False Rejection Rate) is reduced). However, instead of this, this requires a larger range on the recording paper sheet 22 where the printing may not cause the toner or the like to adhere, which causes problems of a reduced degree of freedom in the printing and also complicated processes of the authenticity determination and the like. Therefore, this exemplary embodiment has assumed the size of the reference area in the reading resolution of 400 dpi as 32×32 dots (approximately 2 mm×approximately 2 mm). As will be apparent also from experimental results described below, although the determination precision in the authenticity determination is reduced with the reference area smaller than the above size, the determination precision is only slightly improved even when the reference area is larger than the above size. Therefore, for the reading, it is unnecessary to use an expensive microscope with troublesome handling, and a reading device capable of reading in the resolution on the order of 400 dpi (the reading unit 28 included in the color printer 10, a commercially available, inexpensive scanner and the like) may be practically used.

Furthermore, in reading the reference area, if an output signal from the light-receiving device 28B becomes saturated with an excessive amount of incident light received in the light-receiving device 28B and the like, the reference data accurately representing the clarity variation in the reference area cannot be obtained, because the clarity variation in the reference area represented by the reference data obtained by the reading becomes partially white to be illegible, and the like. Therefore, in reading the reference area, it is preferable to moderately suppress the exposure. Also, instead of using the reading unit 28 included in the color printer 10, in the case of reading with a scanner provided with reading modes such as a photo mode, a document mode, and the like, the reading mode for more precisely reading the clarity variation of the paper sheet (for example, the photo mode) is preferably selected for performing the reading.

After the reference area is read as described above, in step 104, the discrete cosine transform and the like are applied to the reference data obtained by the reading to thereby compress the data. In the next step 106, on the basis of the compressed data, bit map data are generated for printing the data on the recording paper sheet (original) 22 as a code in automatic machine-readable form (for example, a two-dimensional barcode and the like). It should be noted that the data compression in step 104 is not necessary and the data may be coded without being subjected to the data compression. Also, in the case where the position of the reference area changes depending on the document, the reference data obtained by the reading are preferably attached with information representing the position of the reference area, before being subjected to the compression and the coding. Also, the data may be subjected to encryption.

In subsequent step 108, the bit map data generated in step 106 are attached to bit map data to be printed (obtained by expanding, into bit map data, the print data received by the color printer 10 from the PC) so that the code representing the reference data may be printed at the predetermined position on the recording paper sheet (original) 22. Then, in step 110, the above bit map data are output to the optical beam scanning device 16 when the printing is performed on the recording paper sheet (original) 22. In this way, the document which the user desires to print as the original is printed on the recording paper sheet (original) 22 with the code representing the reference data attached at the predetermined position.

It should be noted that, on the recording paper sheet 22 with the document printed as the original, any blot; for example, ink or the like adhering on the area read as the reference area, raises a problem of reduced determination precision in the authenticity determination as described next. Therefore, when the document is printed as the original, it is preferable to simultaneously print a mark or the like explicitly denoting the area read as the reference area; for example, to call the user's attention to preventing the blot or the like from adhering on the above area. On the other hand, since it is effective for forgery prevention to avoid explicitly denoting the area read as the reference area, the above area is not necessarily explicitly denoted intentionally for the purpose of forgery prevention.

Moreover, in order to prevent the reduced determination precision in the authenticity determination even with the blot or the like adhering on the area read as the reference area, it is preferable to set multiple reference areas, to read the respective individual reference areas, and store multiple reference data obtained by the reading. Thereby, even with the blot or the like adhering on a part of the multiple areas read as the reference areas, this part can be removed and other areas without the blot or the like adhering can be used to perform the authenticity determination, which may prevent the reduced determination precision in the authenticity determination.

Next, the authenticity determination process executed by the PC 32 in the case of determining the authenticity of the paper sheet (document) with the code printed at the predetermined position will be described with reference to a flowchart shown in FIG. 6. It should be noted that this authenticity determination process is realized by reading the authenticity determination program from the HDD of the PC 32 when the user wishing to confirm the authenticity of the above document instructs execution of the authenticity determination, and executes the read authenticity determination program by the CPU of the PC 32.

In step 120, a message requesting to set the document subjected to the authenticity determination on the scanner 34 (to place the document on the manuscript stand) is displayed on the display, and the user sets the document subjected to the authenticity determination on the scanner 34. In step 122, a determination is made as to whether or not the document has been completely set, and step 122 is repeated until a positive determination is made. If the document subjected to the authenticity determination has been set on the scanner 34, the positive determination is made in step 122 and the process proceeds to step 124, where the scanner 34 is instructed to read the document placed on the manuscript stand.

Thereby, the entire area of the document subjected to the authenticity determination is read with the scanner 34 at the same resolution (400 dpi) and the same tone (8-bit gray scale) as those used for reading the reference area, and image data obtained by the reading are input into the PC 32 by the scanner 34.

It should be noted that, also in this reading, it is preferable to moderately suppress the exposure so that the image data accurately representing the clarity variation particularly in the check area of the document subjected to the authenticity determination may be obtained. If the scanner 34 is provided with multiple reading modes such as the photo mode, the document mode, and the like, the reading mode for more precisely reading the clarity variation of the paper sheet (for example, the photo mode) is preferably selected.

Furthermore, in this exemplary embodiment, the document subjected to the authenticity determination is once taken out of the scanner 34, inverted, and then set on the scanner 34 again. Then the document is read in a similar manner as described above. The light source 50 corresponding to the light-emitting unit of the scanner 34 illuminates the light to the document from a diagonal direction, and its reflected light is received by the line image sensors 52, 62, and 68, whereby the image is read. Similar to the case of obtaining the reference image from the two directions with the color printer 10, a check image has been obtained from two different directions with the scanner 34 by inverting the document and reading the image again.

When the image data are input by the scanner 34, in subsequent step 126, data on the area where the code representing the reference data are printed are extracted from the inputted image data. It should be noted that since the image data input by the scanner 34 include the images read from the two directions, the data would be extracted from the respective read images. In step 128, on the basis of the data extracted in step 126, the reference data are restored by recognizing the data represented by the code printed on the document subjected to the authenticity determination, and performing processes of decompression (decryption if the data have been encrypted) and the like with respect to the recognized data.

Incidentally, in the authenticity determination process according to this exemplary embodiment, values of the correlation between the reference image read and generated in the color printer 10 and the check image read and generated in the scanner 34 would be calculated to thereby perform the authenticity determination of the document to be determined, as described below. However, the reference image includes the image read with the illumination from the first direction (a first read reference image) and the image read with the illumination from the second direction (a second read reference image), while the check image includes the image read with the illumination from the first direction (a first read check image) and the image read with the illumination from the second direction (a second read check image). Therefore, the read images making a combination used for calculating the correlation values and the like have to be selected from the reference image and the check image, respectively. As will be apparent from the following description, in this exemplary embodiment, while the authenticity determination of the document to be determined can be performed not only if a set of the read images with the illuminations from the same direction is selected but also if a set of the read images with the illuminations from the different directions is selected, the following process will be described, assuming that the set of the read images with the illuminations from the same direction was selected at step 129. First, it is assumed that a set of the first read reference image obtained from the light emitted by the light-emitting device 28A and the corresponding first read check image has been selected.

In step 130, data on a check area having its center position corresponding to a center position in the reference area and having a size (64×64 dots) larger than the reference area (accordingly, this check area includes the reference area) is extracted from the image input by the scanner 34. It should be noted that, in the case where the position of the reference area changes depending on the document, the position of the reference area can be recognized, for example, on the basis of the information representing the position of the reference area, which is attached to the reference data.

Moreover, instead of recognizing the position of the reference area on the basis of the information attached to the reference data, the position of the reference area may be automatically recognized by previously printing some sort of mark near the reference area in the printing, performing the reading for the authenticity determination, and then searching the above mark on the image data obtained by the reading. Thereby, in the reading for the authenticity determination, even if the document subjected to the authenticity determination placed on the manuscript stand has been slightly displaced, the position of the reference area can be accurately recognized without being affected by this displacement. Also, the first read check image corresponding to the image read by the light-emitting unit 28A from the first direction is easily identified.

The above mark may be in a point shape, for example. Moreover, with multiple marks previously printed at non-overlapping positions (an optimal number of the marks is two, since the number of marks is preferably as small as possible), if positional relations between the individual marks and the reference area are known, the position and the orientation (angle) of the reference area can be identified from the positions of the multiple marks. Moreover, the marks can be detected as follows, for example.

If one point considered as the mark has been detected as a result of searching the mark on the image data, a determination is made that the detection has failed or that the reference area on the paper sheet has not been read (the document has not been printed as the original). Moreover, for example, if two points considered as the marks have been detected, a Euclidean distance between the two marks is obtained. The two marks are determined to be the marks denoting the reference area if the Euclidean distance falls within an allowable range, and the detection is determined to have failed if the Euclidean distance falls outside the allowable range. If three or more points considered as the marks have been detected, Euclidean distances among the respective marks are obtained. If there is one set of marks having the distance within the allowable range, the set of marks is determined to be the marks denoting the reference area. If no set of marks has the distance within the allowable range or if two or more such sets of marks are provided, the detection may be determined to have failed, or a set having the distance near the allowable range may be selected as the marks denoting the reference area in the meantime. Since FAR can be significantly reduced with appropriately defined thresholds for the authenticity determination in the present invention, even if the points which are actually not the marks denoting the reference area have been erroneously determined to be the marks denoting the reference area, no negative effect is caused on the determination precision in the authenticity determination, although a processing time becomes longer.

Incidentally, in the authenticity determination process according to this exemplary embodiment, retrieving data corresponding to an area (an area to be calculated: a second area) having the same size as the reference area (a first area) from the data on the check area and calculating the value of the correlation between the above data and the reference data are repeated, while a position of the area to be calculated is moved. Therefore, in the next step 132, a data retrieval position (the position of the area to be calculated) in the check area is initialized.

In step 134, the data (check data) on the area having the same size as the reference area and positioned at the preset data retrieval position are retrieved from the data on the check area. Then, in step 136, according to the following formula (1), the value of the correlation between the reference data restored in step 128 and the check data retrieved in step 134 is calculated with a normalized correlation method, and the correlation value obtained by the calculation is stored in the RAM and the like.

[Formula 1]

$$F = \{f_i\}_{i=0}^{N-1} \tag{1}$$

$$G = \{g_i\}_{i=0}^{N-1}$$

$$\text{Correlation Value} = \frac{\sum_{n=0}^{N-1} (f_n - f_{AVE})(g_n - g_{AVE})}{\sqrt{\sum_{n=0}^{N-1} (f_n - f_{AVE})^2} \sqrt{\sum_{n=0}^{N-1} (g_n - g_{AVE})^2}}$$

In subsequent step 138, a determination is made as to whether or not the area to be calculated has been scanned over the whole check area. If a negative determination is made, the process proceeds to step 140, where the data retrieval position is moved vertically or transversely by only one dot, and then the process returns to step 134. This repeats steps 134 to 140 until a positive determination is made in step 138. Since the reference area is 32×32 dots and the check area is 64×64 dots in this exemplary embodiment, the calculation of the correlation value is performed for a total of (64−32+1)×(64−32+1)=1089 times, which provides 1089 correlation values.

When the calculation of the correlation value is completed, the positive determination is made in step 138 and the process proceeds to step 142, where the maximum value is extracted from the many correlation values obtained by the above calculation. In subsequent step 144, a normalized score of the maximum value of the correlation values is calculated by calculating a standard deviation and an average value of the many correlation values and then applying the calculated standard deviation and average value as well as the maximum value of the correlation values obtained in step 142 to the following formula (2), respectively.

Normalized Score=(Maximum Value of Correlation Values−Average Value of Correlation Values)/Standard Deviation of Correlation Values (2)

As described above, the maximum value of the correlation values and the normalized score of the maximum value of the correlation values have been obtained with respect to the selected images read with the illumination from the first direction. However, in step 145, since the process has not yet been performed with respect to the images read with the illumination from the second direction, the process returns to step 129, where a set of the second read reference image obtained from the light emitted by the light-receiving device 28B and the corresponding second read check image is selected, and the above-described process of steps 130 to 144 is performed on this selected data. This provides the maximum value of the correlation values and the normalized score of the maximum value of the correlation values also with respect to the images read with the illumination from the second direction.

In step 146, the authenticity determination of the document to be determined is performed by comparing the maximum value of the correlation values obtained in step 142 and the normalized score calculated in step 144 with their preset thresholds. Since this example is the authenticity determination with the set of the images read with the illumination from the same direction, a determination is made as to whether or not the maximum value of the correlation values obtained in step 142 is greater than or equal to the threshold and the normalized score calculated in step 144 is greater than or equal to the threshold. More specifically, a determination is made as to whether or not the maximum value of the correlation values is greater than or equal to the threshold and the normalized score is greater than or equal to the threshold, in the set of the images read with the illumination from the first direction. In addition, a determination is made as to whether or not the maximum value of the correlation values is greater than or equal to the threshold and the normalized score is greater than or equal to the threshold, in the set of the images read with the illumination from the second direction. It should be noted that, for example "0.3" may be used as the threshold of the maximum value of the correlation values, and, for example, "5.0" may be used as the threshold of the normalized score (refer to FIGS. 8A to 8D).

Then, in step 147, in the authenticity determination of each set, only if a determination criterion is satisfied in which the correlation value and the normalized score of the correlation values are greater than or equal to the respective thresholds and both are determined to be "genuine," a determination result is output in step 148 by displaying a message representing that the document subjected to the authenticity determination is "genuine" on the display and the like, and the authenticity determination process is terminated. On the other hand, if a negative determination is made in at least one determination in step 147, the process proceeds to step 150, where a determination result is output by displaying a message representing that the document subjected to the authenticity determination is "false" on the display and the like, and the authenticity determination process is terminated.

According to this exemplary embodiment, as described above, the authenticity of the document (paper sheet) subjected to the authenticity determination can be precisely determined with simple processes. In this exemplary embodiment, particularly, the reference image has been obtained from multiple directions with respect to a single reference area, and, similarly, the check image has been obtained from multiple directions with respect to a single check area, and then the authenticity determination is performed from the respective directions. Thereby, since multiple reference images cannot be printed with respect to the single check area of the document to be determined, malicious acts of persons who have improperly obtained the reference image can also be addressed, thereby enabling a precise authenticity determination.

Figure 7:
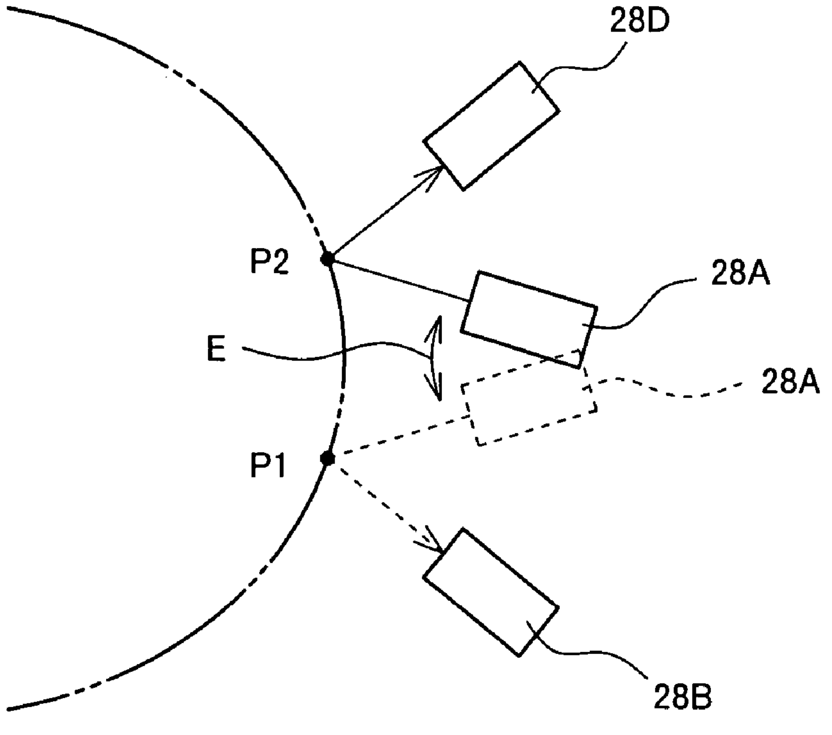
FIG. 7 shows a variation of a reading unit in the color printer according to the present embodiment.

It should be noted that, in this exemplary embodiment, in order to obtain, as the reference image, the images read with the illumination from the two different directions, the two light-emitting devices 28A and 28C are arranged in the color printer 10 as shown in FIG. 1; however, the printer is not limited to this configuration. FIG. 7 shows another exemplary embodiment of the vicinity of the reading unit 28 in FIG. 1. As shown in FIG. 7, one light-emitting device 28A may be provided rotatably in a direction shown by an arrow E, while light-receiving devices 28B and 28D may be arranged on the respective sides of the light-emitting device 28A. In this case, in step 102 in FIG. 4, when the predetermined reference area on the recording paper sheet 22 has arrived at a predetermined reading position P1, the light-emitting device 28A emits the light and causes the light-receiving device 28B to receive its reflected light. Then, the light-emitting device 28A immediately changes its illumination direction, and when the predetermined reference area on the recording paper sheet 22 has arrived at a predetermined reading position P2, the light-emitting device 28A emits the light and causes the light-receiving device 28D to receive its reflected light. According to such a configuration, the read reference images may be obtained with illumination from the two different directions. Also, the first direction and the second direction may be configured with completely different members.

On the other hand, in this exemplary embodiment, in order to obtain, as the check image, the images read with the illuminations from the two different directions, after the image is read, the document subjected to the authenticity determination is inverted and then set on the scanner 34 again. This is because usage of the commercially available scanner 34 is assumed. Therefore, instead of this, a custom-made scanner including two light-emitting units, such as the color printer 10, may be provided. This enables the images to be read with the illumination from the two directions while the scanner is operated only once.

It should be noted that, this exemplary embodiment was intended to improve the precision of the authenticity determination by having a configuration for emitting the light to the predetermined area on the solid body from the two different directions and obtaining multiple read images from the same reference area to thereby perform the authenticity determination. Since achieving this object only requires obtaining the shading information with different light and dark patterns from the same reference area, it is logically conceivable that it requires only collecting the images read with different illumination angles. In other words, it is also conceivable that, on the basis of the predetermined reading position of the solid body, the light is illuminated with different angles from a certain direction; for example, a direction which the solid body leaves (at the side of the light-emitting device 28A in FIG. 1) to obtain the two read images. However, the illuminations from the same direction with different angles would not cause a significant difference in the light and dark patterns even with different illumination angles. Therefore, on the basis of the predetermined reading position of the solid body, the read images are preferably obtained by illuminating the lights from opposite directions to the predetermined reading position of the solid body, as shown in FIG. 1. It is also conceivable that improved precision is obtained by illuminating the lights from not only the two directions but also additional directions to obtain additional read images. However, as described above, since the illuminations from the same direction on the basis of the predetermined reading position of the solid body hardly cause the difference in the light and dark patterns, it is efficient to obtain the read images with the illuminations from the two opposite directions, as in this exemplary embodiment.

Since the same illumination directions on the basis of this predetermined area hardly cause the difference in the light and dark patterns, it can be said that it is unnecessary to have such an adjustment as necessarily matching the illumination angles from the respective light-emitting devices 28A and 28C in the color printer 10 to the recording paper sheet 22, and the illumination angle from the light source 50 in the scanner 34 to the document.

Incidentally, in the above description, the two reference images and the two check images are provided, and the sets of the reference images and the check images are formed with the read images obtained with the illuminations from the same direction, when performing the authenticity determination. In other words, the sets of 2 to 2 (precisely (1 to 1)×2) sets are formed with the reference images and the check images. In this exemplary embodiment, the authenticity determination can also be performed with more combinations. As an example, the case will be described where the read reference images obtained with the illuminations from the two directions are obtained as the reference image, and the read check image obtained with the illumination from one direction is obtained as the check image. In other words, the case will be described where the reference images and the check image are 2 to 1.

Figure 4:
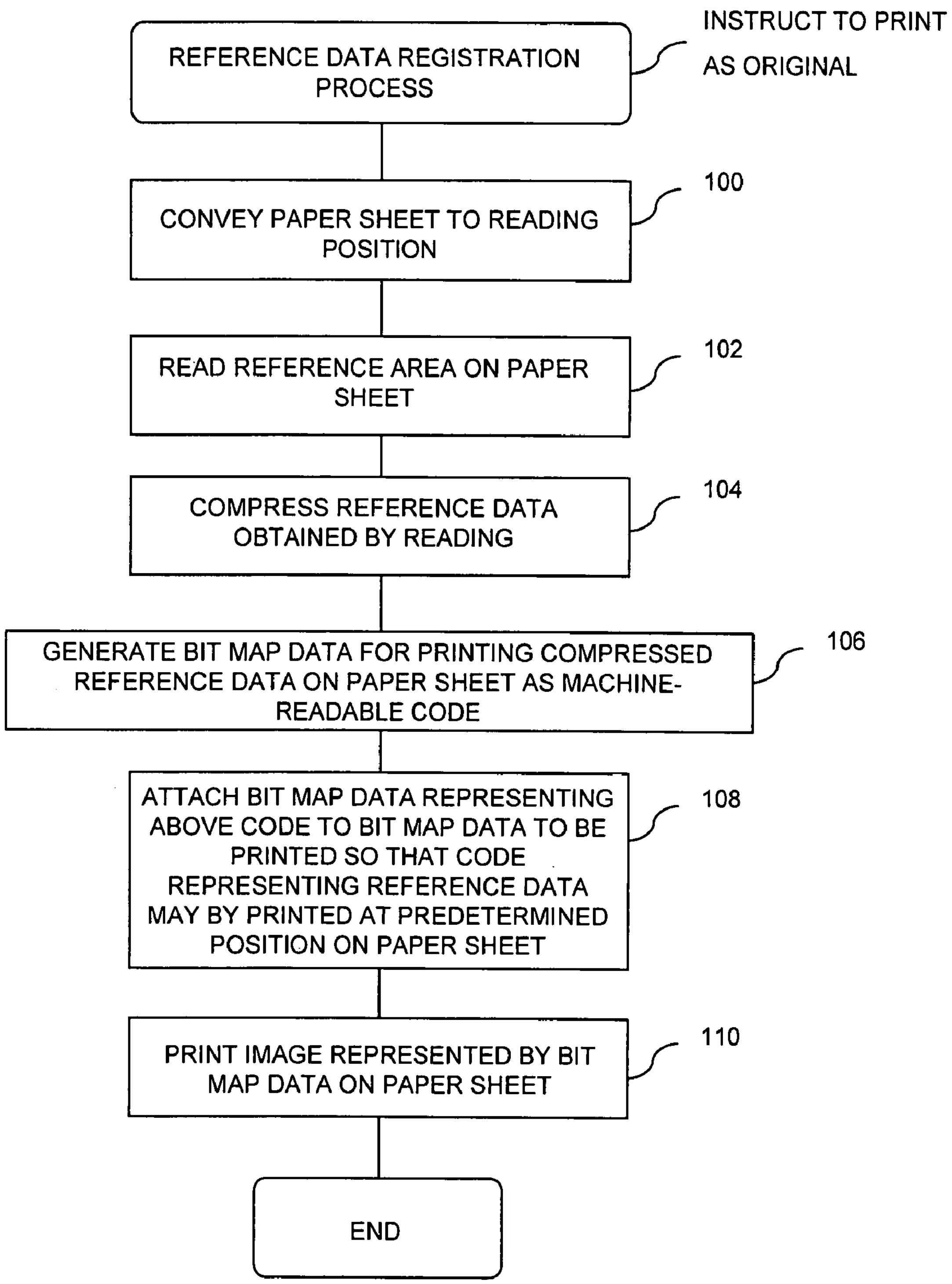
FIG. 4 is a flowchart showing a reference data registration process executed by the color printer in the present embodiment.

First, the reference data registration process obtains the read reference images with the illuminations from the two directions, which is the same as the process described with reference to FIG. 4. Therefore, its description is omitted.

A basic process flow of the authenticity determination process is as described with reference to FIG. 6. However, in steps 120 to 124, the only requirement is to obtain the read check image from one direction. Then, in step 129, a set consisting of the first read reference image and the first read check image is formed, as is a set consisting of the second read reference image and the first read check image, to thereby perform the following process. It should be noted that in this case the first direction is not limited to the direction which the recording paper sheet 22 leaves in the color printer 10. In steps 130 to 144, in the former case, since the read images are obtained by illuminating from the same direction, the maximum value of the correlation values and the normalized score of the maximum value of the correlation values are obtained in a manner similar to the above-described process. On the other hand, in the latter case, values opposite to the former case are obtained. In other words, in step 142, a minimum value is extracted from many correlation values obtained by the previous calculation. Then, in step 144, the normalized score of the minimum value of the correlation values is calculated by calculating the standard deviation and the average value of the many correlation values and then applying the calculated standard deviation and average value as well as the minimum value of the correlation values obtained in step 142 to the above described formula (2). It should be noted that in this case "Maximum Value" in the above-described formula (2) is replaced with "Minimum Value."

In step 146, the authenticity determination with the set of the read images obtained with the illuminations from the same direction determines whether or not the maximum value of the correlation values obtained in step 142 is greater than or equal to the threshold and the normalized score calculated in step 144 is greater than or equal to the threshold, as described above. The former; that is, the set consisting of the first read reference image and the first read check image, corresponds to this. Meanwhile, the authenticity determination with the set consisting of the read images obtained with the illuminations from the different directions inversely determines whether or not the minimum value of the correlation values obtained in step 142 is less than or equal to the threshold and the normalized score calculated in step 144 is less than or equal to the threshold. In this case, the document is determined to be "genuine" if both are less than or equal to the thresholds.

When the document to be determined is "genuine," with the illuminations from the same direction, the light and dark patterns (shading information) appearing in the image data should be identical. However, in fact, since some errors and the like occur, the maximum values and the like of the correlation values become greater than or equal to the thresholds as described in step 146. Therefore, the obtained maximum value of the correlation values and the normalized score of the maximum value are compared with the respective thresholds, and the document is determined to be "genuine" if both are grater than or equal to the thresholds. On the contrary, with the illuminations from the different directions, the light and dark patterns (shading information) appearing in the image data should be totally opposite. Therefore, contrary to the case of the same direction, the minimum value of the correlation values and the normalized score of the minimum value are obtained, the minimum value of the correlation values and the normalized score of the minimum value are compared with the respective thresholds, and the document is determined to be "genuine" if both are less than or equal to the thresholds.

As a result, if the positive determination is made in the authenticity determination of the respective sets in step 147; that is, only if both are determined to be "genuine," the process proceeds to step 148, where the determination result is output by displaying a message representing that the document subjected to the authenticity determination is "genuine" on the display and the like, and the authenticity determination process is terminated. On the other hand, if the negative determination is made in at least one determination in step 147, the process proceeds to step 150, where the determination result is output by displaying the message representing that the document subjected to the authenticity determination is "false" on the display and the like, and the authenticity determination process is terminated.

In the first description, the authenticity determination was performed with 2 to 2 (precisely (1 to 1)×2); however, as described here, 2 to 1 relation of two reference images and one check image can also accomplish a similar effect as the case of 2 to 2. In this case, the only necessity is to read the check image only once with the scanner 34, thereby reducing the user's workload.

Furthermore, in this exemplary embodiment, the authenticity determination can be performed with 1 to 2 relation of one reference image and two check images.

First, the reference data registration process obtains the read reference image obtained with the illumination from one direction. Therefore, the image reading with the illumination from one of the light-emitting devices 28A and 28C is omitted. Either of them may be omitted. The remainder of the process is the same as the process described with FIG. 4. Hence, its description is omitted.

Figure 6:
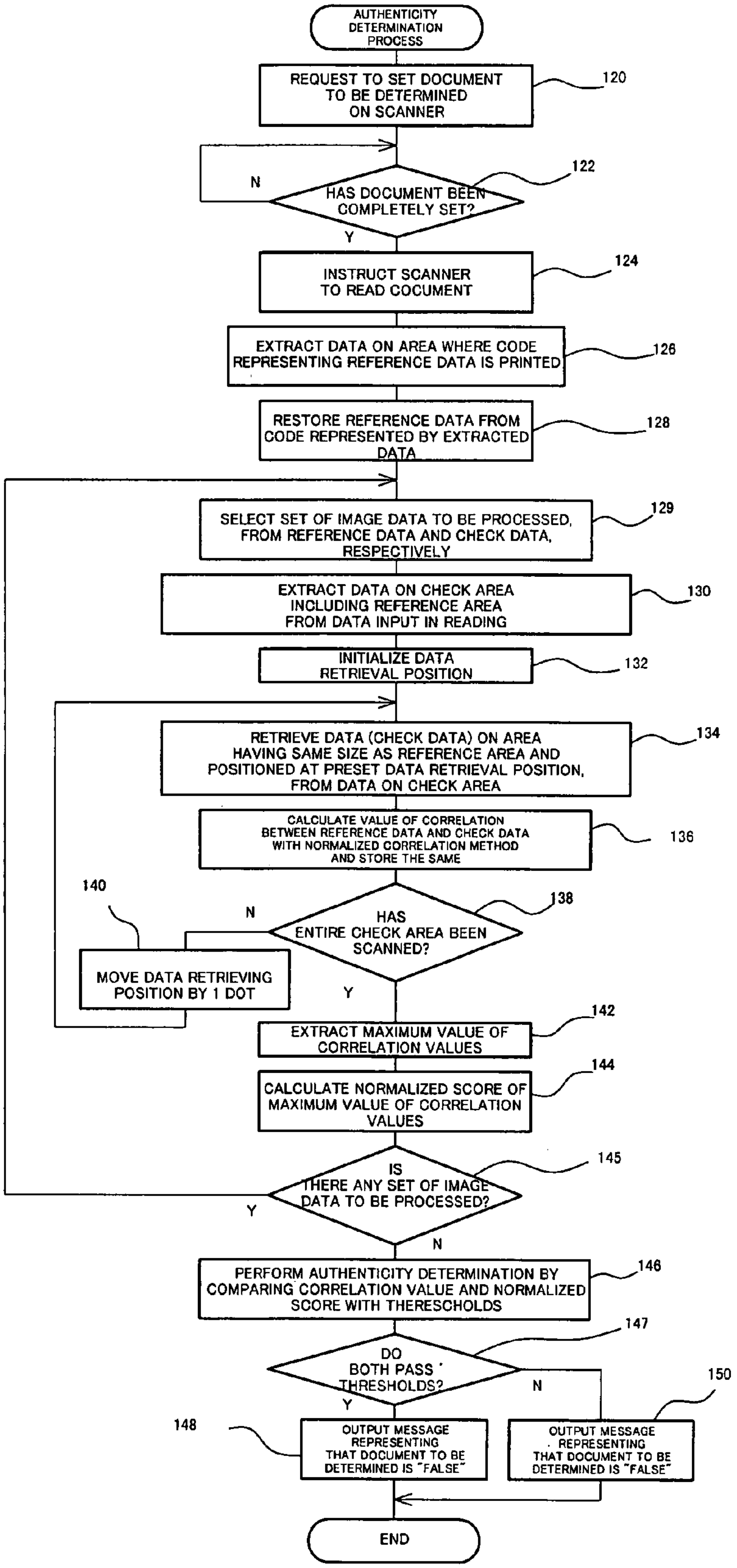
FIG. 6 is a flowchart showing an authenticity determination process executed by the PC (authenticity determination apparatus) in the present embodiment.

The basic process flow of the authenticity determination process is as described with FIG. 6. In this case, in step 129, a set consisting of the first read reference image and the first read check image is formed, as is a set consisting of the first read reference image and the second read check image, to thereby perform the following process. In steps 130 to 144, in the former case, since the read images are obtained by illuminating from the same direction, the maximum value of the correlation values and the normalized score of the maximum value of the correlation values are obtained in a manner similar to the above-described process. On the other hand, in the latter case; that is, the case of the read images obtained by illuminating from the different directions, is also the same as described above, and in step 142, the minimum value of the correlation values is extracted, and in step 144, the normalized score of the minimum value of the correlation values is calculated. Since the authenticity determination from step 146 is also the same as in the case of 2 to 1 of two read reference images and one read check image, its description is omitted.

The case of 1 to 2 of one read reference image and two read check images can also accomplish a similar effect as the case of 2 to 2. In this case, it is unnecessary to provide two light-emitting devices 28A and 28C in the color printer 10. In the case of configuring the reference data with one read reference image, although the reference image is likely to be improperly printed on the recording paper sheet 22, it is conceivable that both determinations with the correction values in the authenticity determination are not necessarily determined to be "genuine," since multiple images of the check area are read from the different directions.

It should be noted that, since this exemplary embodiment performs the authenticity determination of the document to be processed, on the basis of the read images of the reference area, the blot on the reference area due to the toner or the like adhering thereon causes reduced precision of the authenticity determination. Therefore, it is necessary to prevent the reduced precision by various methods. As a specific method thereof, a method described in the specification of a patent application by the same applicant as the present application described above can be used to prevent the reduced precision of the authenticity determination.

Figure 8A:
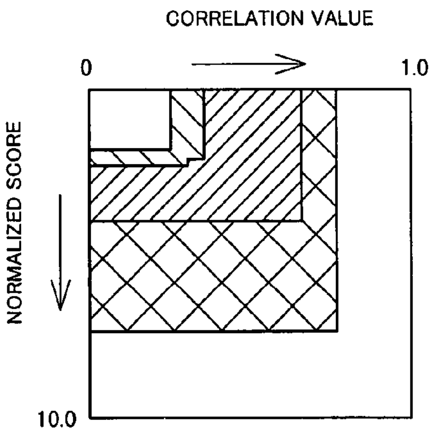
FIG. 8A is an image diagram showing a relation among thresholds of a maximum value of correlation values and a normalized score of the maximum value of the correlation values, FAR and FRR, in an experiment using a reference area having black spot noise and a check area in the present embodiment.
Figure 8B:
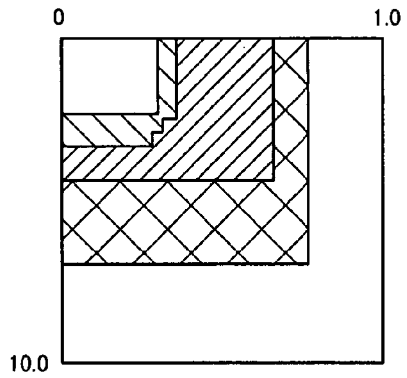
FIG. 8B is an image diagram showing the relation among the thresholds of the maximum value of the correlation values and the normalized score of the maximum value of the correlation values, FAR and FRR, in the experiment using the reference area having the black spot noise and the check area in the present embodiment.
Figure 8C:
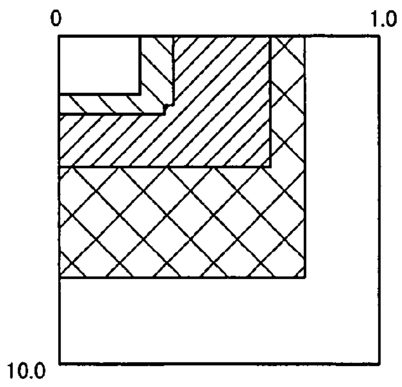
FIG. 8C is an image diagram showing the relation among the thresholds of the maximum value of the correlation values and the normalized score of the maximum value of the correlation values, FAR and FRR, in the experiment using the reference area having the black spot noise and the check area in the present embodiment.
Figure 8D:
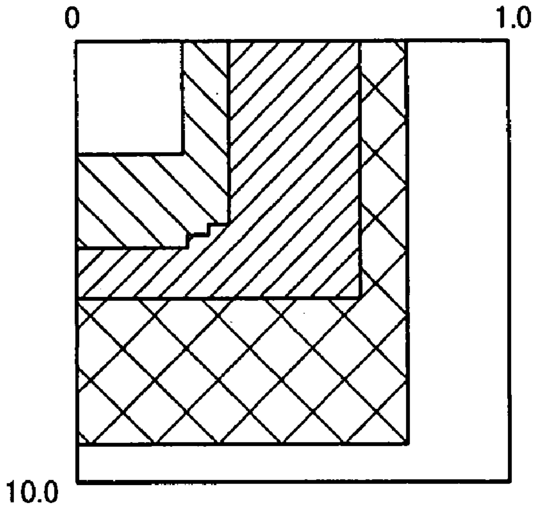
FIG. 8D is an image diagram showing the relation among the thresholds of the maximum value of the correlation values and the normalized score of the maximum value of the correlation values, FAR and FRR, in the experiment using the reference area having the black spot noise and the check area in the present embodiment.
Figure 8E:
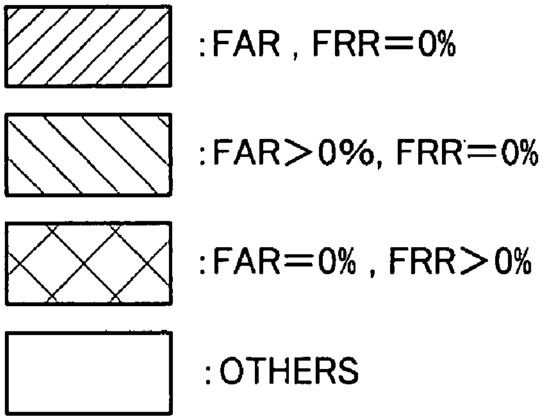
FIG. 8E illustrates FIGS. 8A to 8D.

In addition, FIGS. 8A to 8D show experimental results of verifying advantages of the present invention according to the same method as the above-described patent application. In FIGS. 8A to 8D, when the maximum value of the correlation values is set on the horizontal axis (0.00 at the left end and 1.00 at the right end), and the normalized score of the maximum value of the correlation values is set on the vertical axis (0.0 at the upper end and 10.0 at the lower end), variations of values of FRR and FAR with respect to variations of the thresholds of the maximum value of the correlation values and the normalized score of the maximum value of the correlation values are shown. In FIGS. 8A to 8D, FRR was obtained on the basis of the read images in which the reference image (naturally "genuine") and the check image ("genuine" was herein used) were obtained with the same illumination direction, and FAR was obtained on the basis of the reference image and the read image obtained with an illumination direction different from that for the reference image. Moreover, in FIG. 8A, the reference area has the size of 32×32 dots, and the check area has the size of 64×64 dots. In FIG. 8B, the reference area has the size of 32×32 dots, and the check area has the size of 128×128 dots. FIGS. 8C and 8D show the experimental results with different materials. In FIG. 8C, the reference area has the size of 32×32 dots, and the check area has the size of 64×64 dots. In FIG. 8D, the reference area has the size of 32×32 dots, and the check area has the size of 128×128 dots. It should be noted that an object of this experiment is to show that, with "genuine," a normalized correlation value and the normalized score become lower in a check between the reference image and the read image obtained with the illumination direction different from that for obtaining the reference image, and this experiment uses data originally provided for calculating FRR in the check of the read image obtained with the different illumination direction, for calculating FAR.

As is apparent from FIGS. 8A to 8D, with "genuine," a normalized correlation and the normalized score can be specifically segmented with the difference in the illumination directions, and the authenticity determination can be performed precisely, even if the reference image was printed on the paper sheet with an accurate photo technique and the like and the same delicate pattern of a genuine texture as that of the reference image was printed on a printing paper sheet with high reproducibility.

The invention claimed is:

1. An authenticity determination method performed by a computer for determining authenticity of a solid body with a readable and unique characteristic having randomness distributed along a surface thereof, comprising:

generating a read image of a state of a surface of a genuine solid body as a reference image, the read image being read by a light-receiving unit receiving reflected light of light illuminated by a light-emitting unit toward the surface of the genuine solid body from at least one of a first direction, and a second direction which is different from the first direction, and also generating, as a check image, a read image of a state of a surface of a solid body to be determined, the read image being read by a light-receiving unit receiving reflected light of light illuminated by a light-emitting unit toward the surface of the solid body to be determined from at least one of the first direction and the second direction; and performing a check process with at least two sets of read reference images and read check images, including one or two read reference images included in the reference image and one or two read check images included in the check image, wherein the generating step generates as the reference image a first reference image and a second read reference image with illuminations from the first and the second directions, and also generates as the check image a first read check image and a second read check image with illuminations from both the first and the second directions;

the step of performing the check process checks between the first read reference image and the first read check image, as well as between the second read reference image and the second read check image;

the determining step determines the solid body to be genuine, as a result of respective check processes, if a preset determination criterion has been satisfied in both processes;

if the check processes have been performed with one of the first and second reference images and one of the first and second check images with illuminations from the same direction, the determining step determines the solid body to be genuine, when a normalized correlation value of the one of the first and second reference images and the one of the first and second check images is greater than or equal to a preset threshold; and if the check processes have been performed with one of the first and second reference images and one of the first and second check images with the illuminations from different directions, the determining step determines the solid body to be genuine when a normalized correlation value of the one of the first and second reference images and the one of the first and second check images is less than or equal to a preset threshold.

2. The authenticity determination method according to claim 1, wherein the first direction and the second direction are opposite directions with respect to a reading position on the surface of the solid body.

3. A non-transitory computer-readable medium storing a program, the program causing a computer connected with a reading apparatus capable of reading a characteristic unique to a solid body, the characteristic being distributed along a surface of the solid body and having randomness, to execute a process, the process comprising:

generating a read image of a state of a surface of a genuine solid body as a reference image, the read image being read by a light-receiving unit receiving reflected light of light illuminated by a light-emitting unit toward the surface of the genuine solid body from at least one of a first direction, and a second direction which is different from the first direction;

generating, as a check image, a read image of a state of a surface of a solid body to be determined, the read image being read by a light-receiving unit receiving reflected light of light illuminated by a light-emitting unit toward the surface of the solid body to be determined from at least one of the first direction and the second direction; and performing a check process between one or two read reference images included in the reference image and one or two read check images included in the check image, wherein the generating step generates as the reference image a first reference image and a second read reference image with illuminations from the first and the second directions, and also generates as the check image a first read check image and a second read check image with illuminations from both the first and the second directions;

the step of performing the check process checks between the first read reference image and the first read check image, as well as between the second read reference image and the second read check image;

the determining step determines the solid body to be genuine, as a result of respective check processes, if a preset determination criterion has been satisfied in both processes;

if the check processes have been performed with one of the first and second reference images and one of the first and second check images with illuminations from the same direction, the determining step determines the solid body to be genuine, when a normalized correlation value of the one of the first and second reference images and the one of the first and second check images is greater than or equal to a preset threshold; and if the check processes have been performed with one of the first and second reference images and one of the first and second check images with the illuminations from different directions, the determining step determines the solid body to be genuine when a normalized correlation value of the one of the first and second reference images and the one of the first and second check images is less than or equal to a preset threshold.

* * * * *